United States Patent Office 3,053,701
Patented Sept. 11, 1962

3,053,701
DEPOLARIZER FOR RECHARGEABLE CELLS
Lewis F. Urry, Parma, and Harry W. Holland, Rocky River, Ohio, assignors to Union Carbide Corporation, a corporation of New York
No Drawing. Filed Nov. 12, 1959, Ser. No. 852,202
3 Claims. (Cl. 136—138)

This invention relates to rechargeable alkaline galvanic cells and it more particularly relates to an improved cathode-depolarizer composition for such cells.

In order to produce electric power by galvanic action, a cell system comprising an anode, a cathode-depolarizer, and an electrolyte must be chemically reacted. In this process, the materials used for these elements become exhausted to such an extent that upon discharge of the cell, the anode has become oxidized and the cathode-depolarizer reduced to totally different chemical substances from those initially making up the cell. In certain galvanic systems, it is possible to reactivate, or charge, the cell elements by passing current through the cell. This current effectively reverses the galvanic process thus recombining the elements of the cell into the charged state. It is obvious that cells of this type are very advantageous for certain applications. Some of the more common uses to which rechargeable cells are put are automobile starting systems and submarine power plants.

Certain cathode-depolarizers which are well known to the primary galvanic cell art have come to the attention of people working with secondary or rechargeable alkaline cells because of their availability and relatively moderate price. It has been suggested that either mercuric oxide or manganese dioxide would have advantages to offer the rechargeable cell field. Mercuric oxide may be discharged at high current drains while yielding a high output per unit volume. Another important characteristic of this material is that its voltage-against-time discharge curve is relatively flat. Unfortunately, these good properties of mercuric oxide are offset by the fact that upon discharge, metallic mercury is formed and this material coalesces. When it is sought to recharge the mercury by electrolytic oxidation, only the outside surface of the mercury can be oxidized because the oxide formed effectively shields the remainder of the mercury from further oxidation. In addition to this, mercury charges at a relatively constant potential until the charging is complete, at which time the cell voltage rises substantially instantaneously to the decomposition potential of the electrolyte of the cell being charged. This steep rise makes it practically impossible to put a voltage cutoff sensing device in the system which is capable of stopping the charging operation before other components of the cell become damaged.

Manganese dioxide has been considered as a cathode-depolarizer for rechargeable alkaline galvanic cells because of its low cost, good depolarizing action, and ready availability. This material, however, shows a tendency to discharge at decreasing voltage over a period of time. Also, while a spent manganese dioxide electrode is rechargeable by the passage of current therethrough, this rechargeability is lost when it is discharged beyond a certain critical oxidation level. Thus, this material cannot be effectively recharged after a deep discharge.

It is therefore the principal object of this invention to provide a cathode-depolarizer for rechargeable alkaline galvanic cells which operates at high currents with a high output per unit volume.

It is another object of this invention to provide such a cathode-depolarizer which exhibits a relatively flat discharge curve under load.

It is further an object of this invention to provide such a cathode-depolarizer which exhibits a charging curve such that a voltage cutoff device may be used to maintain the charging voltage below a level which is destructive to other cell elements.

These objects are fulfilled by this invention which comprises a cathode-depolarizer composition for rechargeable alkaline galvanic cells composed of manganese dioxide powder, each particle of which carries mercuric oxide, wherein 25 percent to 95 percent of the composition is manganese dioxide. This is made possible by the absorption of mercury on particles of manganese dioxide and is accomplished by grinding together a mixture of metallic mercury and powdered manganese dioxide. This may also be accomplished by methods known to the art, for example bringing gaseous mercury into intimate contact with powdered manganese dioxide. If the proper proportions of these materials are employed, all the mercury will be absorbed on the manganese dioxide. The composition of mercury absorbed on manganese dioxide, which is adapted to be charged into a cathode-depolarizer, is formed and is then subjected to a charging current which oxidizes the mercury to mercuric oxide.

In preparing the cathode-depolarizer composition of this invention, only as much mercury as can be completely absorbed on the manganese dioxide particles should be used. It has been found that a proportion of 5 percent to 75 percent by weight, 2 percent to 87 percent by volume, of mercury is the broad range for a cathode-depolarizer composition made according to this invention. While this is the broad range, it is preferred to have from 40 to 50 weight percent of manganese dioxide. The broad range of proportions of manganese dioxide present in the cathode-depolarizer composition, after charging thereof by oxidation of the mercury to mercuric oxide, has been found to be 25 percent to 95 percent by weight, with a preferred range being 38 percent to 49 percent by weight.

This cathode-depolarizer exhibits a high discharge current and a high output per unit volume while maintaining a steady voltage during discharge under load. Charging of this material is facilitated by the fact that the voltage charging curve for the combined oxides is flat until all the mercury is charged to mercuric oxide and then rises rapidly, but not instantaneously, while the reduced oxides of manganese are being charged. This behavior permits the use of a voltage sensing device in the charging circuit in order to insure that the voltage will not reach the decomposition potential of the electrolyte or other components of the cell during the charging. This voltage sensing device is capable of cutting off the electrical input to the cell at a predetermined voltage level when charging is completed.

In addition, the cathode-depolarizer composition permits construction of alkaline cells which are capable of withstanding heavy discharge drains at fairly constant voltage. Because of this, cells employing this cathode-depolarizer yield the theoretical capacity of the cell based on mercuric oxide.

The following may be cited as specific examples of the practice of this invention:

*Example 1*

A composition adapted to be charged into a cathode-depolarizer, containing 37.5 percent mercury and 62.5 percent manganese dioxide by weight was made by mixing together 30.1 grams of metallic mercury and 50.4 grams of manganese dioxide so that the mercury was absorbed on the manganese dioxide.

*Example 2*

A composition adapted to be charged into a cathode-depolarizer, containing 28 percent mercury and 72 percent manganese dioxide by weight was made by mixing together 21.3 grams of metallic mercury and 54.7 grams of manganese dioxide.

*Example 3*

A composition adapted to be charged into a cathode-depolarizer, containing 10 percent mercury and 90 percent manganese dioxide was made by mixing together 7.5 grams of metallic mercury and 67.5 grams of manganese dioxide.

*Example 4*

A composition adapted to be charged into a cathode-depolarizer, containing 60 percent mercury and 40 percent manganese dioxide was made by mixing together 49.1 grams of metallic mercury and 32.8 grams of manganese dioxide.

Cathode-depolarizer compositions made according to this invention have been incorporated in standard rechargeable alkaline cells and tested to determine the characteristics of their charge-discharge cycles. It was found that the discharge performance (potential against time) of such cathode-depolarizer compositions was the same after 40 cycles as it was upon initial discharge. Negative electrodes used in the cells thus tested were made of zinc or cadmium but it has been found that many other anodes are adapted to use in conjunction with the cathode-depolarizer composition described herein. Advantage may be taken of the high electrical conductivity of the subject composition in the partially discharged state, in which at least some metallic mercury is present, to eliminate most or possibly all of the inert conductive material, such as graphite, usually used.

What is claimed is:

1. A composition adapted to be charged to form a cathode-depolarizer for a rechargeable alkaline galvanic cell which comprises manganese dioxide powder, each particle of which has mercury absorbed thereon, said manganese dioxide constituting 25 percent to 95 percent by weight of said composition, the balance being absorbed mercury.

2. A cathode-depolarizer composition for rechargeable alkaline galvanic cells which comprises manganese dioxide powder, each particle of which has mercuric oxide absorbed thereon, said manganese dioxide constituting 25 percent to 95 percent by weight of said composition, the balance being absorbed mercuric oxide.

3. A cathode-depolarizer composition for rechargeable alkaline galvanic cells which comprises electrolytically oxidized mercury absorbed on manganese dioxide powder, said manganese dioxide constituting 38 percent to 49 percent by weight of said composition, the balance being absorbed oxidized mercury.

References Cited in the file of this patent

UNITED STATES PATENTS

| | | |
|---|---|---|
| 1,195,677 | Heil | Aug. 22, 1916 |
| 1,434,469 | Wilker | Nov. 7, 1922 |
| 1,602,850 | Heise | Oct. 12, 1926 |
| 2,481,539 | Ruben | Sept. 13, 1949 |

FOREIGN PATENTS

| | | |
|---|---|---|
| 132,560 | Great Britain | Sept. 18, 1919 |